United States Patent
Wang et al.

(10) Patent No.: US 12,339,237 B2
(45) Date of Patent: Jun. 24, 2025

(54) ON-LINE DETECTION SYSTEM FOR DEFECTS OF MEMBRANE ELECTRODE ASSEMBLY

(71) Applicant: China University of Petroleum (East China), Qingdao (CN)

(72) Inventors: Min Wang, Qingdao (CN); Jiexin Zou, Qingdao (CN); Mingbo Wu, Qingdao (CN); Han Hu, Qingdao (CN); Zhongtao Li, Qingdao (CN); Debin Kong, Qingdao (CN); Guanxiong Wang, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 202 days.

(21) Appl. No.: 18/235,386

(22) Filed: Aug. 18, 2023

(65) Prior Publication Data
US 2024/0094140 A1    Mar. 21, 2024

(30) Foreign Application Priority Data

Sep. 19, 2022 (CN) .......................... 202211136381.7

(51) Int. Cl.
*G01N 21/89* (2006.01)
*B65H 20/02* (2006.01)
*G01N 21/892* (2006.01)

(52) U.S. Cl.
CPC ......... *G01N 21/8914* (2013.01); *B65H 20/02* (2013.01); *G01N 21/892* (2013.01); *B65H 2404/10* (2013.01); *B65H 2406/15* (2013.01); *B65H 2701/19* (2013.01)

(58) Field of Classification Search
CPC .. G01N 21/8914; G01N 21/892; B65H 20/02; B65H 2404/10; B65H 2406/15; B65H 2701/19
See application file for complete search history.

(56) References Cited

U.S. PATENT DOCUMENTS

2006/0029121 A1* 2/2006 Boehmisch ............ G01N 25/72
374/45

FOREIGN PATENT DOCUMENTS

CN          111473918 A  *  5/2020  ................ G01J 5/00

* cited by examiner

*Primary Examiner* — Georgia Y Epps
*Assistant Examiner* — Don J Williams
(74) *Attorney, Agent, or Firm* — Bayramoglu Law Offices LLC

(57) ABSTRACT

An on-line detection system for defects of an MEA is provided. The detection system includes a workbench, two connecting rods are arranged inside the workbench, two ends of the two connecting rods are both connected to two side walls of the workbench by means of bearings, and conveying rollers are fixedly arranged outside the two connecting rods in a sleeving manner. One side of the workbench is fixedly provided with a first electric motor, and an output end of the first electric motor is fixedly connected to one of the connecting rods. Belt pulleys are fixedly arranged outside the two connecting rods in a sleeving manner, and a belt is arranged outside the two belt pulleys in a sleeving manner. A hollow roller is arranged on an inner side of the workbench, and a plurality of exhaust holes are provided in a top of the hollow roller.

10 Claims, 6 Drawing Sheets

ON-LINE DETECTION SYSTEM FOR DEFECTS OF MEMBRANE ELECTRODE ASSEMBLY

CROSS REFERENCE TO THE RELATED APPLICATIONS

This application is based upon and claims priority to Chinese Patent Application No. 202211136381.7, filed on Sep. 19, 2022, the entire contents of which are incorporated herein by reference.

TECHNICAL FIELD

The present invention relates to the technical field of on-line defect detection of a membrane electrode assembly (MEA), and in particular to an on-line detection system for defects of an MEA.

BACKGROUND

A fuel cell is a device that converts chemical energy of hydrogen and oxygen into electric energy, and has the main characteristics as follows: the fuel cell has the advantages of environmental protection, high efficiency, large energy density, high output power, wide application range, etc., the main components of the fuel cell include two end plates, two flow field plates, two current collecting plates and an MEA, where the MEA is an important component of an electrochemical reaction and includes components such as an ion exchange membrane, two catalytic layers and two gas diffusion layers and the like, and currently, most of commercially available finished products are ion exchange membranes or catalyst-coated membranes (CCMs).

An existing MEA is detected by naked eyes, and the method for observing, determining and analyzing a surface defect condition by naked eyes is relatively primitive, consumes a lot of manpower and time cost, has low production efficiency and low manual detection resolution, and is likely to cause the situations of missing detection, false detection, etc.

Existing defect diagnosis for the MEA is tested by using a laser range finder, a defect is determined according to the fact that a deviation between a defect position and a nominal distance value is ≥a preset tolerance value, and such a method cannot eliminate the possibility that wrong determination is caused due to existing of wrinkles in a conveying process. If a bottom is ensured to be free of wrinkles by means of vacuum adsorption, a test speed is reduced, and the time cost is increased.

In detection of small defects, if a detection sample is an ion exchange membrane, the detection sample is a transparent sample and is not easy to observe, and a detection instrument is required to have an amplification factor and perform rapid and accurate detection, such that the investment cost is high, and detection time is long. A surface of a CCM-type MEA is completely black, holes are not easy to observe, and a light-emitting device is required to be placed below the CCM-type MEA. If the MEA is detected, the MEA is assembled with a gas diffusion layer, a surface of the gas diffusion layer is loose and porous, and therefore, existence of defects cannot be determined.

Detection of uniformity of a catalyst coating at a laboratory level is mainly performed by using a thickness gauge, which has the defects that a lot of manpower and time cost are consumed, resolution of manual detection is low, and missing detection and false detection are likely to be caused. Small defects are observed by using a microscope, a scanning electron microscope, a transmission electron microscope, etc., which has the defect that only surface defects can be identified singly.

SUMMARY

Therefore, the present invention provides an on-line detection system for defects of an MEA so as to solve the problems that the method for observing, determining and analyzing a surface defect condition by naked eyes is relatively primitive, consumes a lot of manpower and time cost, has low production efficiency and low manual detection resolution, and is likely to cause the situations of missing detection, false detection, etc.

In order to achieve the above objective, the present invention provides the following technical solution: an on-line detection system for defects of an MEA includes a workbench, where two connecting rods are arranged inside the workbench, two ends of the two connecting rods are both connected to two side walls of the workbench by means of bearings, and conveying rollers are fixedly arranged outside the two connecting rods in a sleeving manner. One side of the workbench is fixedly provided with a first electric motor, and an output end of the first electric motor is fixedly connected to one of the connecting rods. Belt pulleys are fixedly arranged outside the two connecting rods in a sleeving manner, and a belt is arranged outside the two belt pulleys in a sleeving manner. A hollow roller is arranged on an inner side of the workbench, each of both sides of the hollow roller is fixedly connected to two fixing rods, and the other ends of the two fixing rods are fixedly connected to the side wall of the workbench. A plurality of exhaust holes are provided in a top of the hollow roller. One end of the hollow roller is fixedly connected to an hydrogen input pipe, the other end of the hollow roller is fixedly connected to an hydrogen output pipe, and the hydrogen output pipe and the fixing rods both penetrate the side wall of the workbench. Tops of the two conveying rollers are provided with a membrane electrode body, the membrane electrode body makes contact with the top of the hollow roller, and a uniform hydrogen output mechanism is arranged inside the hollow roller.

Preferably, a top of the workbench is fixedly provided with a supporting plate, a bottom of the supporting plate is fixedly provided with an infrared thermal imaging and optical imaging device, and the infrared thermal imaging and optical imaging device is arranged at the top of the hollow roller.

Preferably, the uniform hydrogen output mechanism includes a T-shaped partition plate, where the T-shaped partition plate is fixedly arranged inside the hollow roller, one side of the T-shaped partition plate is provided with a first hydrogen chamber, the other side of the T-shaped partition plate is provided with a second hydrogen chamber, and a plurality of hydrogen output assemblies are arranged on one side of the T-shaped partition plate. The hydrogen output assembly includes a fixing housing, the fixing housing is fixedly arranged on one side of the T-shaped partition plate, and a top of the fixing housing is fixedly provided with two connecting housings. Tops of the two connecting housings are fixedly provided with hydrogen cavities, and one sides of the two hydrogen cavities are fixedly provided with side plates. Interiors of the two connecting housings are provided with baffles. An interior of the fixing housing is provided with a connecting plate, and two sides of the connecting plate are provided with grooves. One sides of the two grooves are provided with sliding pins, one sides of the two sliding pins are fixedly connected to sliding rods, and the sliding rods penetrate the connecting housings and are in sliding connection to the connecting housings. Interiors of the connecting housings are provided with springs, the springs are arranged outside the sliding rods in a sleeving manner, and two ends of the springs are in contact with the baffles and side walls of the connecting housings respectively. One ends of the sliding rods extend into the hydrogen cavities, one ends of the sliding rods are fixedly connected to blocking plates, and the blocking plates are in contact with side walls of the hydrogen cavities. One side of the hollow roller is fixedly connected to a fourth electric motor, an output end of the fourth electric motor is fixedly connected to a first connecting rod, and the first connecting rod penetrates the side wall of the hollow roller and is connected to the side wall of the hollow roller by means of a bearing. The other end of the first connecting rod is connected to the other side wall of the hollow roller by means of a bearing, the first connecting rod penetrates a side wall of the fixing housing and is connected to the side wall of the fixing housing by means of a bearing, and the first connecting rod penetrates the connecting plate and is fixedly connected to the connecting plate.

Preferably, the hydrogen output assembly further includes two connecting hoses, and the two connecting hoses are fixedly arranged on tops of the two hydrogen cavities respectively. Tops of the two side plates are fixedly provided with piston chambers respectively, and interiors of the two piston chambers are provided with piston plates. The other ends of the two connecting hoses are provided with one-way suction valves, and the two connecting hoses are fixedly connected to the two piston chambers by means of the one-way suction valves respectively. Bottoms of the two piston plates are fixedly connected to guide rods, and one sides of the two guide rods are fixedly connected to connecting buckles. Two second connecting rods are arranged inside the hollow roller, and two ends of the two second connecting rods are both connected to two side walls of the hollow roller by means of bearings. One side of the hollow roller is fixedly provided with a third electric motor, and an output end of the third electric motor is fixedly connected to one of the second connecting rods. Chain wheels are fixedly arranged outside the two second connecting rods in a sleeving manner, a chain is arranged outside the two chain wheels, the two chain wheels are meshed with the chain, and the chain is fixedly connected to the two connecting buckles. Tops of the two piston chambers are fixedly connected to connecting pipes, the other ends of the two connecting pipes are fixedly connected to one-way exhalation valves, the other ends of the two one-way exhalation valves are fixedly connected to a cover, and the cover is in communication with the exhaust hole.

Preferably, an interior of the workbench is provided with a marking assembly, the marking assembly includes a pigment box, the pigment box is arranged on the inner side of the workbench, and one side of the pigment box is fixedly connected to a sliding block. The inner side of the workbench is provided with a lead screw, two ends of the lead screw are both connected to the two side walls of the workbench by means of bearings, and the lead screw penetrates the sliding block and is in threaded connection to the sliding block. One side of the workbench is fixedly connected to a second electric motor, and an output end of the second electric motor is fixedly connected to the lead screw. An interior of the pigment box is connected to a fixing shaft by means of a bearing, and the fixing shaft penetrates the other side wall of the pigment box and is connected to the other side wall of the pigment box by means of a bearing. A gear is fixedly arranged outside the fixing shaft in a sleeving manner, and two marking wheels are fixedly arranged outside the fixing shaft in a sleeving manner. A bottom plate is fixedly embedded inside the pigment box, a sponge is arranged at a top of the bottom plate, a plurality of adsorption rods are fixedly embedded at a bottom of the bottom plate, and the adsorption rods penetrate the bottom plate and are in contact with the sponge. Tops of the marking wheels are in contact with a bottom of the MEA Preferably, an arc-shaped baffle is fixedly arranged inside the workbench, and a bottom of the arc-shaped baffle is in contact with a top of the MEA.

Preferably, a toothed plate is fixedly arranged inside the workbench, and the toothed plate is meshed with the gear.

Preferably, a slide rod is fixedly connected inside the workbench, and the slide rod penetrates the sliding block and is in sliding connection to the sliding block.

Preferably, four corners of a bottom of the workbench are fixedly connected to supporting legs.

Preferably, the marking wheels are arranged inside the pigment box.

The examples of the present invention have the following advantages:

1. Surface defects can be quickly observed by means of optical photographing, moreover, thickness defects can be quickly analyzed by means of thermal imaging photographing, heat release during an electrochemical reaction is observed by means of light radiation, and positions of the small defects are determined by means of distribution of hot spots, such that excessive cost investment is not needed, detection is fast, and on-line diagnosis photographing is mostly used for detecting horizontal plane distribution.

2. The uniform hydrogen output mechanism is arranged, such that the two piston plates repeatedly and alternately suck the hydrogen in the first hydrogen chamber and the second hydrogen chamber by means of the hydrogen cavities and the connecting hoses into the piston chambers. Repeated piston pushing makes one of the connecting pipes always inject the hydrogen into the exhaust holes through the covers and transmits the hydrogen to the surface of the MEA by means of the exhaust holes, such that heat generated by a chemical reaction between the hydrogen and air is evenly distributed, and hot spot observation is facilitated.

3. The marking assembly is arranged, such that the marking wheels at the top of the pigment box are in contact with the bottom of the MEA. Surfaces of the marking wheels are always covered with pigment, such that marking is facilitated. Moreover, the adsorption rods adsorb the pigment and transfer the pigment to the sponge, such that the sponge is filled with the pigment. During a marking process, the conveying rollers convey positions of defects of the MEA to the top of the pigment box and stop conveying, such that the positions of the defects are marked, subsequent treatment of a defective product is facilitated, and avoiding a cost increase due to processing of the defective product in a subsequent process. Furthermore, the positions of the defects can be quickly re-inspected twice.

BRIEF DESCRIPTION OF THE DRAWINGS

In order to more clearly illustrate the implementations of the present invention or the technical solutions in the prior art, a brief introduction to the accompanying drawings required for the description of the implementations or the prior art will be provided below. Obviously, the drawings in the following description are only exemplary. For those of ordinary skill in the art, other implementation drawings can be derived from the provided drawings without creative work.

The structure, scale, size, etc. shown in the drawings of this description are only used to match the content disclosed in the description and for those skilled in the art to understand and read, instead of being used to limit the limitations for implementing the present invention, and thus they are not technically substantial. Any structural modification, scale relation change, or size adjustment made without affecting the effects and objectives that can be achieved by the present invention shall fall within the scope that can be encompassed by the technical content disclosed in the present invention.

FIG. 6 is an enlarged diagram of a structure of portion A in FIG. 5 provided by the present invention; and.

In the figures: 1, workbench; 2, MEA; 3, supporting plate; 4, arc-shaped baffle; 5, toothed plate; 6, conveying roller; 7, connecting rod; 8, supporting leg; 9, first electric motor; 10, hydrogen output pipe; 11, belt; 12, belt pulley; 13, hydrogen input pipe; 14, second electric motor; 15, hollow roller; 16, fixing rod; 17, third electric motor; 18, fourth electric motor; 19, pigment box; 20, gear; 21, exhaust hole; 22, infrared thermal imaging and optical imaging device; 23, first hydrogen chamber; 24, T-shaped partition plate; 25, second hydrogen chamber; 26, cover; 27, one-way exhalation valve; 28, connecting pipe; 29, one-way suction valve; 30, connecting hose; 31, piston chamber; 32, guide rod; 33, blocking plate; 34, hydrogen cavity; 35, sliding rod; 36, connecting housing; 37, fixing housing; 38, first connecting rod; 39, connecting plate; 40, groove; 41, sliding pin; 42, spring; 43, baffle; 44, chain; 45, second connecting rod; 46, chain wheel; 47, connecting buckle; 48, side plate; 49, piston plate; 50, fixing shaft; 51, sliding block; 52, slide rod; 53, lead screw; 54, sponge; 55, bottom plate; 56, adsorption rod; and 57, marking wheel.

DETAILED DESCRIPTION OF THE EMBODIMENTS

The implementation of the present disclosure will be illustrated below in conjunction with specific embodiments. Those skilled in the art can easily understand other advantages and effects of the present disclosure from the content disclosed in this specification. Obviously, the described embodiments are merely a part rather than all of the embodiments of the present disclosure. All other embodiments obtained by those of ordinary skill in the art based on the embodiments of the present invention without creative efforts shall fall within the scope of protection of the present invention.

Figure 1:
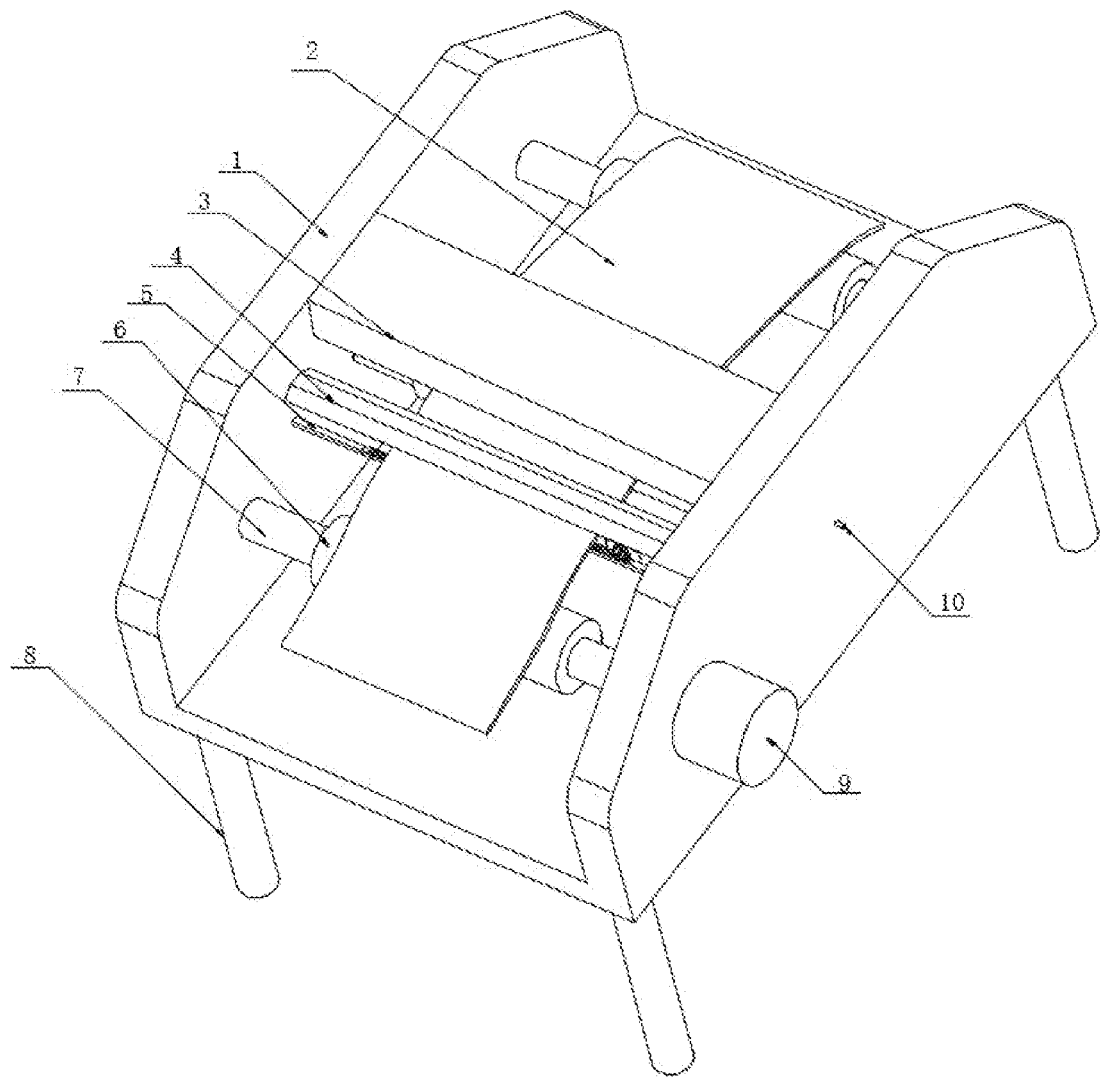
FIG. 1 is a schematic diagram of an integral structure provided by the present invention.
Figure 2:
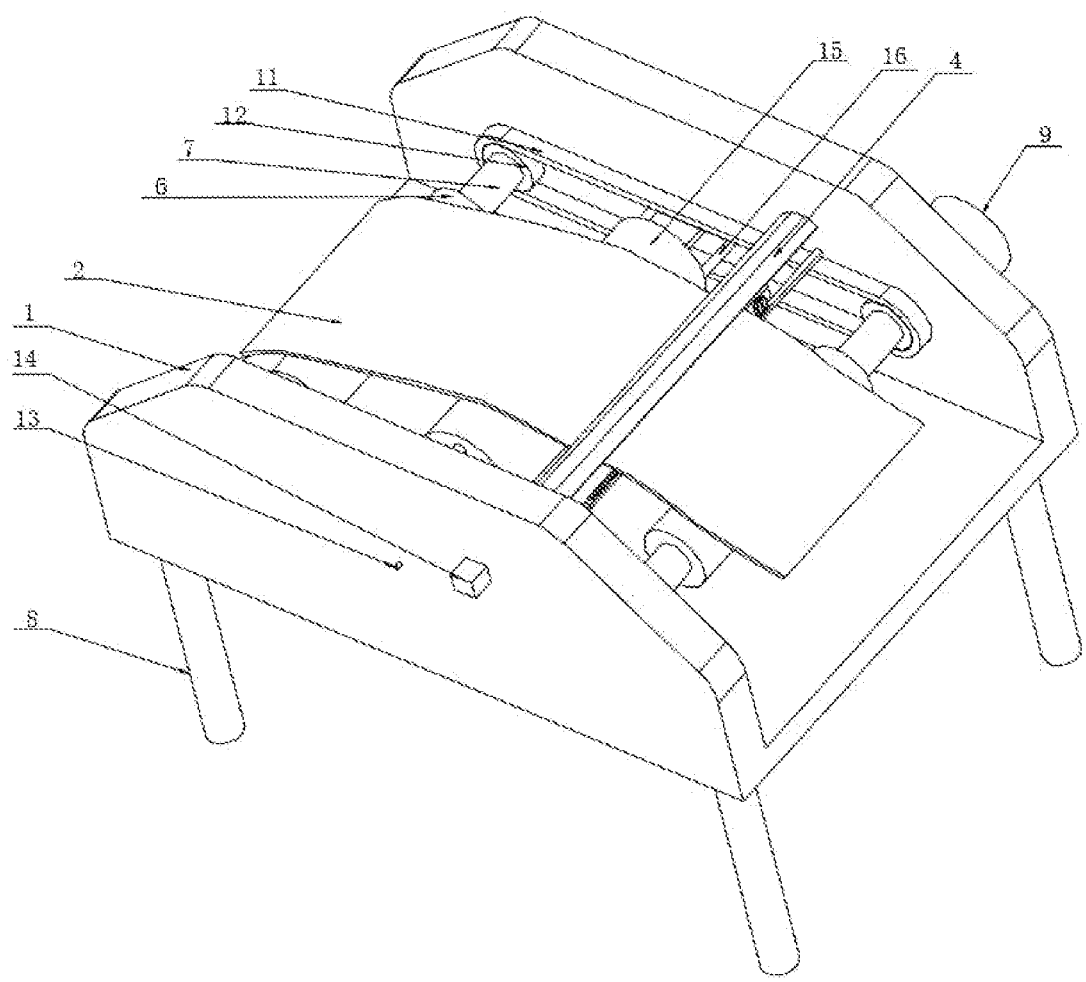
FIG. 2 is a top view of an integral structure provided by the present invention.
Figure 3:
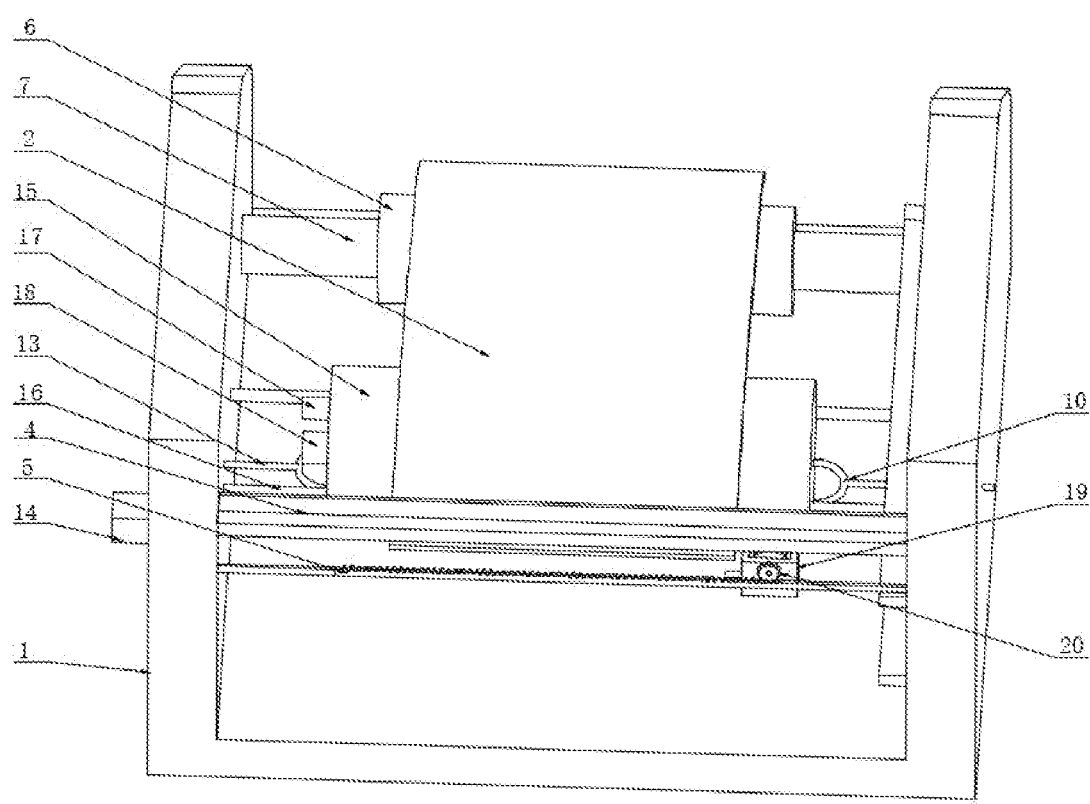
FIG. 3 is a cutaway view of a side view structure provided by the present invention.
Figure 4:
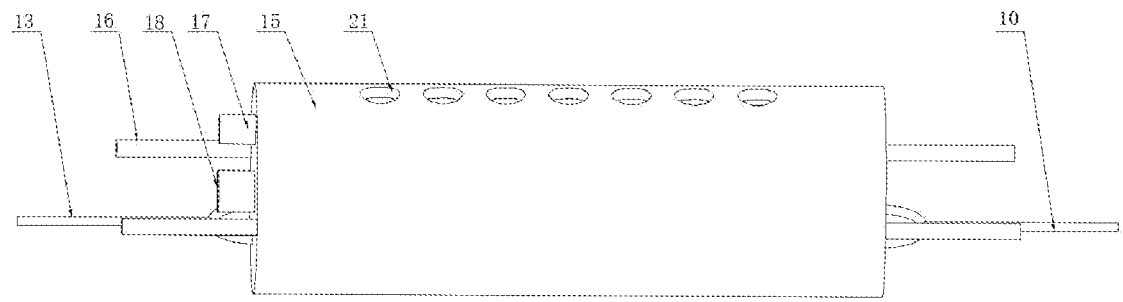
FIG. 4 is a stereogram of a hollow roller provided by the present invention.
Figure 5:
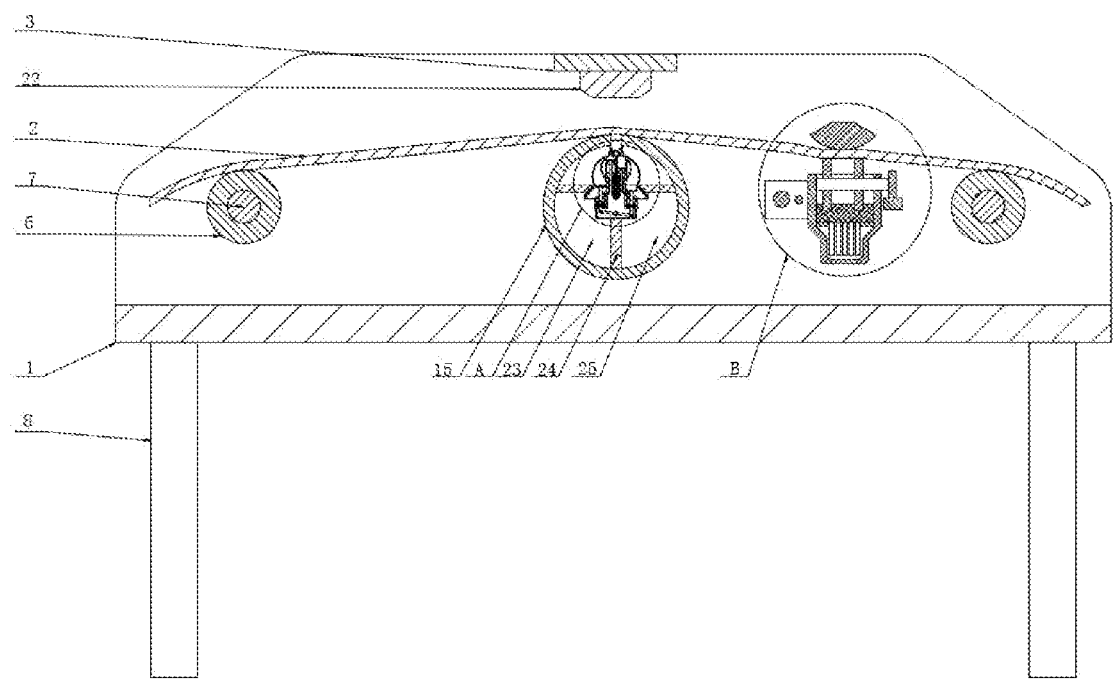
FIG. 5 is a cutaway view of a front view structure provided by the present invention.
Figure 6:
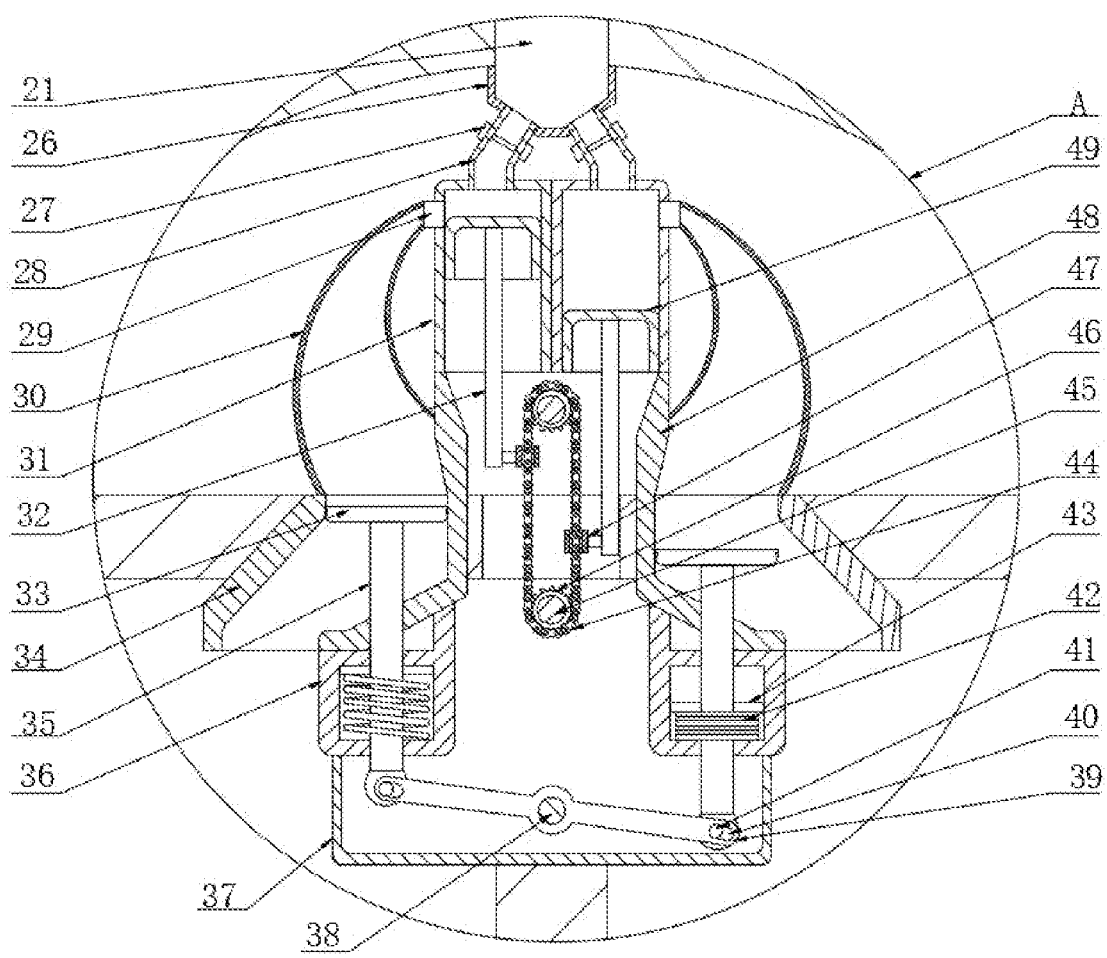
Figure 7:
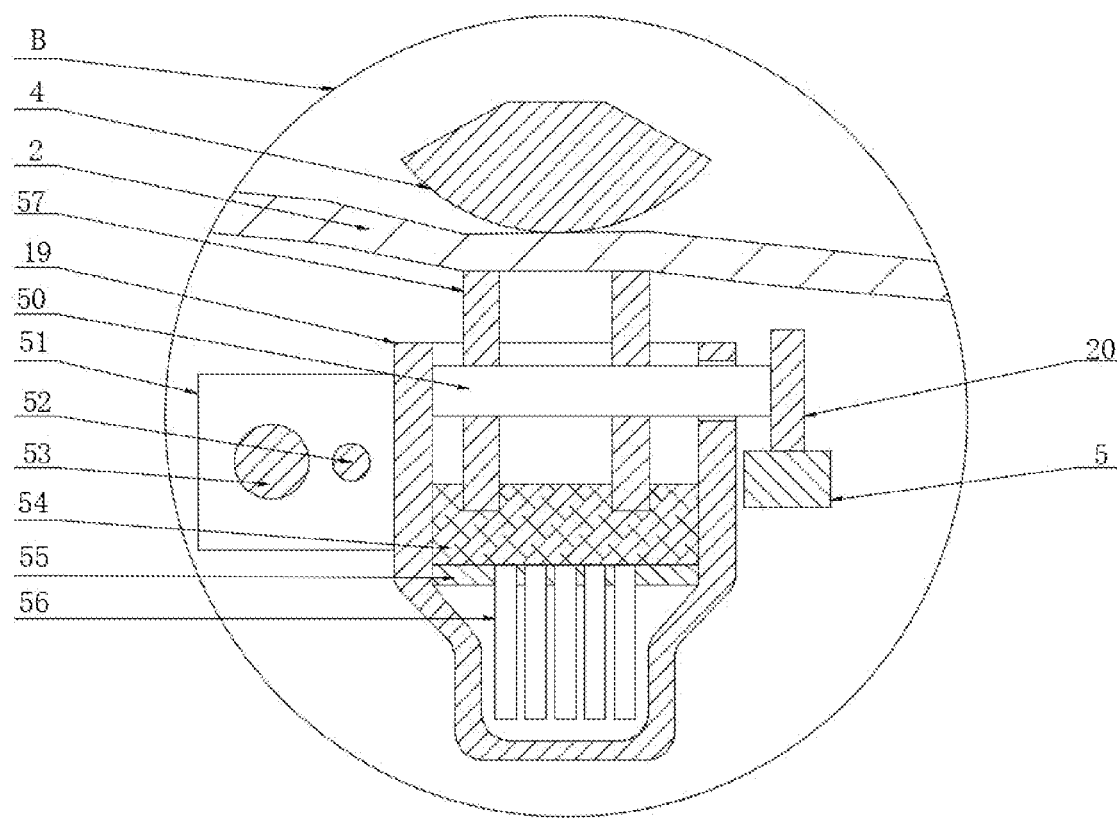
FIG. 7 is an enlarged diagram of a structure of portion B in FIG. 5 provided by the present invention.

With reference to FIGS. 1-7, the present invention provides an on-line detection system for defects of an MEA. The system includes a workbench 1, where two connecting rods 7 are arranged inside the workbench 1, two ends of the two connecting rods 7 are both connected to two side walls of the workbench 1 by means of bearings, and conveying rollers 6 are fixedly arranged outside the two connecting rods 7 in a sleeving manner. One side of the workbench 1 is fixedly provided with a first electric motor 9, and an output end of the first electric motor 9 is fixedly connected to one of the connecting rods 7. Belt pulleys 12 are fixedly arranged outside the two connecting rods 7 in a sleeving manner, and a belt 11 is arranged outside the two belt pulleys 12 in a sleeving manner. A hollow roller 15 is arranged on an inner side of the workbench 1, each of both sides of the hollow roller 15 is fixedly connected to two fixing rods 16, and the other ends of the two fixing rods 16 are fixedly connected to the side wall of the workbench 1. A plurality of exhaust holes 21 are provided in a top of the hollow roller 15. One end of the hollow roller 15 is fixedly connected to an hydrogen input pipe 13, the other end of the hollow roller 15 is fixedly connected to an hydrogen output pipe 10, and the hydrogen output pipe 10 and the fixing rods 16 both penetrate the side wall of the workbench 1. Tops of the two conveying rollers 6 are provided with a MEA 2, the MEA 2 makes contact with the top of the hollow roller 15, and a uniform hydrogen output mechanism is arranged inside the hollow roller 15. A top of the workbench 1 is fixedly provided with a supporting plate 3, a bottom of the supporting plate 3 is fixedly provided with an infrared thermal imaging and optical imaging device 22, and the infrared thermal imaging and optical imaging device 22 is arranged at the top of the hollow roller 15. The uniform hydrogen output mechanism includes a T-shaped partition plate 24, the T-shaped partition plate 24 is fixedly arranged inside the hollow roller 15, one side of the T-shaped partition plate 24 is provided with a first hydrogen chamber 23, the other side of the T-shaped partition plate 24 is provided with a second hydrogen chamber 25, and a plurality of hydrogen output assemblies are arranged on one side of the T-shaped partition plate 24. The hydrogen output assembly includes a fixing housing 37, the fixing housing 37 is fixedly arranged on one side of the T-shaped partition plate 24, and a top of the fixing housing 37 is fixedly provided with two connecting housings 36. Tops of the two connecting housings 36 are fixedly provided with hydrogen cavities 34, and one sides of the two hydrogen cavities 34 are fixedly provided with side plates 48. Interiors of the two connecting housings 36 are provided with baffles 43. An interior of the fixing housing 37 is provided with a connecting plate 39, and two sides of the connecting plate 39 are provided with grooves 40. One sides of the two grooves 40 are provided with sliding pins 41, one sides of the two sliding pins 41 are fixedly connected to sliding rods 35, and the sliding rods 35 penetrate the connecting housings 36 and are in sliding connection to the connecting housings 36. Interiors of the connecting housings 36 are provided with springs 42, the springs 42 are arranged outside the sliding rods 35 in a sleeving manner, and two ends of the springs 42 are in contact with the baffles 43 and side walls of the connecting housings 36 respectively. One ends of the sliding rods 35 extend into the hydrogen cavities 34, one ends of the sliding rods 35 are fixedly connected to blocking plates 33, and the blocking plates 33 are in contact with side walls of the hydrogen cavities 34. One side of the hollow roller 15 is fixedly connected to a fourth electric motor 18, an output end of the fourth electric motor 18 is fixedly connected to a first connecting rod 38, and the first connecting rod 38 penetrates the side wall of the hollow roller 15 and is connected to the side wall of the hollow roller 15 by means of a bearing. The other end of the first connecting rod 38 is connected to the other side wall of the hollow roller 15 by means of a bearing, the first connecting rod 38 penetrates a side wall of the fixing housing 37 and is connected to the side wall of the fixing housing 37 by means of a bearing, and the first connecting rod 38 penetrates the connecting plate 39 and is fixedly connected to the connecting plate 39. The hydrogen output assembly further includes two connecting hoses 30, and the two connecting hoses 30 are fixedly arranged on tops of the two hydrogen cavities 34 respectively. Tops of the two side plates 48 are fixedly provided with piston chambers 31 respectively, and interiors of the two piston chambers 31 are provided with piston plates 49. The other ends of the two connecting hoses 30 are provided with one-way suction valves 29, and the two connecting hoses 30 are fixedly connected to the two piston chambers 31 by means of the one-way suction valves 29 respectively. Bottoms of the two piston plates 49 are fixedly connected to guide rods 32, and one sides of the two guide rods 32 are fixedly connected to connecting buckles 47. Two second connecting rods 45 are arranged inside the hollow roller 15, and two ends of the two second connecting rods 45 are both connected to two side walls of the hollow roller 15 by means of bearings. One side of the hollow roller 15 is fixedly provided with a third electric motor 17, and an output end of the third electric motor 17 is fixedly connected to one of the second connecting rods 45. Chain wheels 46 are fixedly arranged outside the two second connecting rods 45 in a sleeving manner, a chain 44 is arranged outside the two chain wheels 46, the two chain wheels 46 are meshed with the chain 44, and the chain 44 is fixedly connected to the two connecting buckles 47. Tops of the two piston chambers 31 are fixedly connected to connecting pipes 28, the other ends of the two connecting pipes 28 are fixedly connected to one-way exhalation valves 27, the other ends of the two one-way exhalation valves 27 are fixedly connected to a cover 26, and the cover 26 is in communication with the exhaust hole 21.

In this implementation solution, the first electric motor 9 is started, the first electric motor 9 drives the connecting rods 7 to rotate, the two connecting rods 7 rotate in the same direction by means of the arrangement of the belt pulleys 12 and the belt 11, the two connecting rods 7 drive the conveying rollers 6 to rotate, and the two conveying rollers 6 rotate and convey the MEA 2. The MEA 2 passes through the top of the hollow roller 15, and the hollow roller 15 is fixed by the fixing rods 16. The hydrogen input pipe 13 and the hydrogen output pipe 10 are fixedly connected to two sides of the hollow roller 15 respectively, hydrogen is introduced by means of the hydrogen input pipe 13 to be injected into the first hydrogen chamber 23 and the second hydrogen chamber 25 in the hollow roller 15, and the hydrogen is discharged from the hydrogen output pipe 10. Ball valves are arranged at one side of the hydrogen input pipe 13 and one side of the hydrogen output pipe 10 to control opening and closing of hydrogen input and output, and an adjusting valve is arranged at one side of the hydrogen input pipe 13 to control gas flow. After the first hydrogen chamber 23 and the second hydrogen chamber 25 are filled with the hydrogen, the fourth electric motor 18 and the third electric motor 17 are started, the fourth electric motor 18 is started and drives the first connecting rod 38 to rotate, the first connecting rod 38 rotates and drives connecting plate 39 to rotate, and the connecting plate 39 drives the sliding rods 35 to rise. At the same time, the sliding pins 41 on one sides of the sliding rods 35 slide in the grooves 40, such that the blocking plates 33 at the tops of the sliding rods 35 block the hydrogen cavities 34. At the same time, the sliding rod 35 on the right moves downwards, such that the sliding rod 35 on the right pulls the blocking plate 33 on the right to move downwards, and the hydrogen cavity 34 on the right is opened. At the same time, the baffle 43 on the right compresses the right spring 42. The third electric motor 17 is started and drives the second connecting rods 45 to rotate clockwise, such that the second connecting rods 45 enable the chain 44 to rotate clockwise by means of cooperation of the chain 44 and the chain wheels 46. The chain 44 drives the connecting buckle 47 and the guide rod 32 on the right to move down slowly, such that the guide rod 32 on the right pulls the piston plate 49 on the right to move downwards, the piston plate 49 on the right moves downwards and sucks hydrogen by means of the one-way suction valve 29 and the connecting hose 30 on the right, and the hydrogen in the second hydrogen chamber 25 enters the piston chamber 31 on the right by means of the hydrogen cavity 34 on the right. After the hydrogen is sucked out completely, the third electric motor 17 controls the second connecting rods 45 to rotate counterclockwise, such that the chain 44 rotates counterclockwise. At the same time, the fourth electric motor 18 controls the first connecting rod 38 to rotate counterclockwise, such that the connecting plate 39 rotates counterclockwise and pulls the sliding rod 35 to move downwards, the hydrogen cavity 34 on the left is opened, and meanwhile, the hydrogen cavity 34 on the right is closed. The chain 44 rotates counterclockwise and drives the connecting buckle 47 and the guide rod 32 on the right to move upwards, such that the piston plate 49 on the right moves upwards and pushes the hydrogen in the piston chamber 31 on the right to be discharged by means of the right connecting pipe 28 and evenly discharged by means of the exhaust holes 21. Meanwhile, the guide rod 32 and the connecting buckle 47 on the left move downwards, such that the guide rod 32 on the left pulls the piston plate 49 in the piston chamber 31 on the left to move downwards, and the left piston plate 49 sucks the hydrogen in the first hydrogen chamber 23 into the piston chamber 31 on the left by means of the hydrogen cavity 34 on the left and the connecting hose 30. The repeated piston pushing makes one of the connecting pipes 28 always inject the hydrogen into the exhaust holes 21 by means of the covers 26, and the hydrogen directly reacts with the air under catalysis of a catalyst in a catalytic layer, and heat is generated on the MEA 2. Surface defects can be quickly observed by means of photographing of the infrared thermal imaging and optical imaging device 22. Moreover, thickness defects can be quickly analyzed by means of thermal imaging photographing, and heat distribution of a membrane electrode belt is monitored.

In order to achieve the objective to mark the defects, the apparatus is implemented by employing the following technical solution: an interior of the workbench 1 is provided with a marking assembly, the marking assembly includes a pigment box 19, the pigment box 19 is arranged on an inner side of the workbench 1, and one side of the pigment box 19 is fixedly connected to a sliding block 51. The inner side of the workbench 1 is provided with a lead screw 53, two ends of the lead screw 53 are both connected to the two side walls of the workbench 1 by means of bearings, and the lead screw 53 penetrates the sliding block 51 and is in threaded connection to the sliding block 51. One side of the workbench 1 is fixedly connected to a second electric motor 14, and an output end of the second electric motor 14 is fixedly connected to the lead screw 53. An interior of the pigment box 19 is connected to a fixing shaft 50 by means of a bearing, and the fixing shaft 50 penetrates the other side wall of the pigment box 19 and is connected to the other side wall of the pigment box 19 by means of a bearing. A gear 20 is fixedly arranged outside the fixing shaft 50 in a sleeving manner, and two marking wheels 57 are fixedly arranged outside the fixing shaft 50 in a sleeving manner. A bottom plate 55 is fixedly embedded inside the pigment box 19, a sponge 54 is arranged at a top of the bottom plate 55, a plurality of adsorption rods 56 are fixedly embedded at a bottom of the bottom plate 55, the adsorption rods 56 penetrate the bottom plate 55 and are in contact with the sponge 54, and tops of the marking wheels 57 are in contact with a bottom of the MEA 2. An arc-shaped baffle 4 is fixedly arranged inside the workbench 1, and a bottom of the arc-shaped baffle 4 is in contact with a top of the MEA 2. A toothed plate 5 is fixedly arranged inside the workbench 1, and the toothed plate 5 is meshed with the gear 20. A slide rod 52 is fixedly connected inside the workbench 1, and the slide rod 52 penetrates the sliding block 51 and is in sliding connection to the sliding block 51. Four corners of a bottom of the workbench 1 are fixedly connected to supporting legs 8. The marking wheels 57 are arranged inside the pigment box 19. The second electric motor 14 is started, the second electric motor 14 is started and controls the lead screw 53 to rotate, the lead screw 53 rotates and drives the sliding block 51 to move, and the sliding block 51 moves and drives the pigment box 19 to move, such that the marking wheels 57 at the top of the pigment box 19 make contact with the bottom of the MEA 2. The arc-shaped baffle 4 performs pressing to prevent marking from not being in place. The gear 20 is meshed with the toothed plate 5 during a moving process, such that the gear 20 rotates, and the gear 20 rotates and drives the fixing shaft 50 to rotate. The fixing shaft 50 drives the marking wheels 57 to rotate, and the marking wheels 57 will continuously make contact with the sponge 54 when rotating, such that the surfaces of the marking wheels 57 are always covered with pigment, which facilitates marking. Moreover, the adsorption rods 56 adsorb the pigment and transfer the pigment to the sponge 54, such that the sponge 54 is filled with the pigment. During the marking process, the conveying rollers 6 convey the positions of defects of the MEA 2 to the top of the pigment box 19 and stop conveying.

A using process of the present invention is as follows: during use of the present invention, the first electric motor 9 is started, the first electric motor 9 drives the connecting rods 7 to rotate, the two connecting rods 7 rotate in the same direction by means of the arrangement of the belt pulleys 12 and the belt 11, the two connecting rods 7 drive the conveying rollers 6 to rotate, and the two conveying rollers 6 rotate and convey the MEA 2. The MEA 2 passes through the top of the hollow roller 15, and the hollow roller 15 is fixed by the fixing rods 16. The hydrogen input pipe 13 and the hydrogen output pipe 10 are fixedly connected to two sides of the hollow roller 15 respectively, hydrogen is introduced by means of the hydrogen input pipe 13 to be injected into the first hydrogen chamber 23 and the second hydrogen chamber 25 in the hollow roller 15, and the hydrogen is discharged from the hydrogen output pipe 10. Ball valves are arranged at one side of the hydrogen input pipe 13 and one side of the hydrogen output pipe 10 to control opening and closing of hydrogen input and output, and an adjusting valve is arranged at one side of the hydrogen input pipe 13 to control gas flow. After the first hydrogen chamber 23 and the second hydrogen chamber 25 are filled with the hydrogen, the fourth electric motor 18 and the third electric motor 17 are started, the fourth electric motor 18 is started and drives the first connecting rod 38 to rotate, the first connecting rod 38 rotates and drives the connecting plate 39 to rotate, and the connecting plate 39 drives the sliding rods 35 to rise. At the same time, sliding pins 41 on one sides of the sliding rods 35 slide in the grooves 40, such that the blocking plates 33 at the tops of the sliding rods 35 block the hydrogen cavities 34. At the same time, the sliding rod 35 on the right moves downwards, such that the sliding rod 35 on the right pulls the blocking plate 33 on the right to move downwards, and the hydrogen cavity 34 on the right is opened. At the same time, the baffle 43 on the right compresses the right spring 42. The third electric motor 17 is started and drives the second connecting rods 45 to rotate clockwise, such that the second connecting rods 45 enable the chain 44 to rotate clockwise by means of cooperation of the chain 44 and the chain wheels 46. The chain 44 drives the connecting buckle 47 on the right and the guide rod 32 to move down slowly, such that the guide rod 32 on the right pulls the piston plate 49 on the right to move downwards, the piston plate 49 on the right moves downwards and sucks hydrogen by means of the one-way suction valve 29 and the connecting hose 30 on the right, and the hydrogen in the second hydrogen chamber 25 enters the piston chamber 31 on the right by means of the hydrogen cavity 34 on the right. After the hydrogen is sucked out completely, the third electric motor 17 controls the second connecting rods 45 to rotate counterclockwise, such that the chain 44 rotates counterclockwise. At the same time, the fourth electric motor 18 controls the first connecting rod 38 to rotate counterclockwise, such that the connecting plate 39 rotates counterclockwise and pulls the sliding rod 35 to move downwards, the hydrogen cavity 34 on the left is opened, and meanwhile, the hydrogen cavity 34 on the right is closed. The chain 44 rotates counterclockwise and drives the connecting buckle 47 on the right and the guide rod 32 to move upwards, such that the piston plate 49 on the right moves upwards and pushes the hydrogen in the piston chamber 31 on the right to be discharged by means of the right connecting pipe 28 and evenly discharged by means of the exhaust holes 21. Meanwhile, the guide rod 32 and the connecting buckle 47 on the left move downwards, such that the guide rod 32 on the left pulls the piston plate 49 in the piston chamber 31 on the left to move downwards, and the left piston plate 49 sucks the hydrogen in the first hydrogen chamber 23 into the piston chamber 31 on the left by means of the hydrogen cavity 34 on the left and the connecting hose 30. The repeated piston pushing makes one of the connecting pipes 28 always inject the hydrogen into the exhaust holes 21 by means of the covers 26, and the hydrogen directly reacts with the air under catalysis of a catalyst in a catalytic layer, and heat is generated on the MEA 2. Surface defects can be quickly observed by means of photographing of the infrared thermal imaging and optical imaging device 22. Moreover, thickness defects can be quickly analyzed by means of thermal imaging photographing, and heat distribution of a membrane electrode belt is monitored. When the heat distribution is uneven, the infrared thermal imaging and optical imaging device 22 is connected to an upper computer for data conversion, a programmable PLC is used for controlling the marking assembly, and the marking assembly is controlled according to a transmission speed. The second electric motor 14 is started, the second electric motor 14 is started and controls the lead screw 53 to rotate, the lead screw 53 rotates and drives the sliding block 51 to move, and the sliding block 51 moves and drives the pigment box 19 to move, such that the marking wheels 57 at the top of the pigment box 19 make contact with the bottom of the MEA 2. The arc-shaped baffle 4 performs pressing to prevent marking from not being in place. The gear 20 is meshed with the toothed plate 5 during a moving process, such that the gear 20 rotates, and the gear 20 rotates and drives the fixing shaft 50 to rotate. The fixing shaft 50 drives the marking wheels 57 to rotate, and the marking wheels 57 will continuously make contact with the sponge 54 when rotating, such that the surfaces of the marking wheels 57 are always covered with pigment, which facilitates marking. Moreover, the adsorption rods 56 adsorb the pigment and transfer the pigment to the sponge 54, such that the sponge 54 is filled with the pigment. During the marking process, the conveying rollers 6 convey the positions of the defects of the MEA 2 to the top of the pigment box 19 and stop conveying.

What are described above are only preferred examples of the present invention, and any person skilled in the art may use the technical solution described above to modify the present invention or modify it to an equivalent technical solution. Therefore, any simple modification or equivalent replacement based on the technical solution of the present invention falls within the scope claimed to be protected by the present invention.

What is claimed is:

1. An on-line detection system for defects of a membrane electrode assembly (MEA), comprising a workbench, wherein two connecting rods are arranged inside the workbench, two ends of the two connecting rods are both connected to two side walls of the workbench by means of first bearings, two conveying rollers are fixedly arranged outside the two connecting rods in a sleeving manner, one side of the workbench is fixedly provided with a first electric motor, an output end of the first electric motor is fixedly connected to one of the two connecting rods, two belt pulleys are fixedly arranged outside the two connecting rods in the sleeving manner, a belt is arranged outside the two belt pulleys in the sleeving manner, a hollow roller is arranged on an inner side of the workbench, each of both sides of the hollow roller is fixedly connected to first ends of two fixing rods, second ends of the two fixing rods are fixedly connected to the side wall of the workbench, a plurality of exhaust holes are provided in a top of the hollow roller, a first end of the hollow roller is fixedly connected to an hydrogen input pipe, a second end of the hollow roller is fixedly connected to an hydrogen output pipe, the hydrogen output pipe and the two fixing rods both penetrate the side wall of the workbench, tops of the two conveying rollers are provided with the MEA, the MEA makes contact with the top of the hollow roller, and a uniform hydrogen output mechanism is arranged inside the hollow roller.

2. The on-line detection system according to claim 1, wherein a top of the workbench is fixedly provided with a supporting plate, a bottom of the supporting plate is fixedly provided with an infrared thermal imaging and optical imaging device, and the infrared thermal imaging and optical imaging device is arranged at the top of the hollow roller.

3. The on-line detection system according to claim 1, wherein the uniform hydrogen output mechanism comprises a T-shaped partition plate, the T-shaped partition plate is fixedly arranged inside the hollow roller, a first side of the T-shaped partition plate is provided with a first hydrogen chamber, a second side of the T-shaped partition plate is provided with a second hydrogen chamber, a plurality of hydrogen output assemblies are arranged on one side of the T-shaped partition plate, each of the plurality of hydrogen output assemblies comprises a fixing housing, the fixing housing is fixedly arranged on one side of the T-shaped partition plate, a top of the fixing housing is fixedly provided with two connecting housings, tops of the two connecting housings are fixedly provided with two hydrogen cavities, one sides of the two hydrogen cavities are fixedly provided with two side plates, interiors of the two connecting housings are provided with baffles, an interior of the fixing housing is provided with a connecting plate, two sides of the connecting plate are provided with two grooves, one sides of the two grooves are provided with two sliding pins, one sides of the two sliding pins are fixedly connected to sliding rods, the sliding rods penetrate the two connecting housings and are in sliding connection to the two connecting housings, the interiors of the two connecting housings are provided with springs, the springs are arranged outside the sliding rods in the sleeving manner, two ends of the springs are in contact with the baffles and side wall of the two connecting housings respectively, one ends of the sliding rods extend into the two hydrogen cavities, one ends of the sliding rods are fixedly connected to blocking plates, the blocking plates are in contact with side walls of the two hydrogen cavities, one side of the hollow roller is fixedly connected to a fourth electric motor, an output end of the fourth electric motor is fixedly connected to a first connecting rod, a first end of the first connecting rod penetrates a first side wall of the hollow roller and is connected to the first side wall of the hollow roller by means of a second bearing, a second end of the first connecting rod is connected to a second side wall of the hollow roller by means of a third bearing, the first connecting rod penetrates a side wall of the fixing housing and is connected to the side wall of the fixing housing by means of a fourth bearing, and the first connecting rod penetrates the connecting plate and is fixedly connected to the connecting plate.

4. The on-line detection system according to claim 3, wherein each of the plurality of hydrogen output assemblies further comprises two connecting hoses, first ends of the two connecting hoses are fixedly arranged on tops of the two hydrogen cavities respectively, tops of the two side plates are fixedly provided with two piston chambers respectively, interiors of the two piston chambers are provided with two piston plates, second ends of the two connecting hoses are provided with one-way suction valves, the two connecting hoses are fixedly connected to the two piston chambers by means of the one-way suction valves respectively, bottoms of the two piston plates are fixedly connected to two guide rods, one sides of the two guide rods are fixedly connected to two connecting buckles, two second connecting rods are arranged inside the hollow roller, two ends of the two second connecting rods are both connected to two side walls of the hollow roller by means of fifth bearings, one side of the hollow roller is fixedly provided with a third electric motor, an output end of the third electric motor is fixedly connected to one of the two second connecting rods, two chain wheels are fixedly arranged outside the two second connecting rods in the sleeving manner, a chain is arranged outside the two chain wheels, the two chain wheels are meshed with the chain, the chain is fixedly connected to the two connecting buckles, tops of the two piston chambers are fixedly connected to first ends of two connecting pipes, second ends of the two connecting pipes are fixedly connected to first ends of two one-way exhalation valves, second ends of the two one-way exhalation valves are fixedly connected to a cover, and the cover is in communication with the exhaust hole.

5. The on-line detection system according to claim 1, wherein an interior of the workbench is provided with a marking assembly, the marking assembly comprises a pigment box, the pigment box is arranged on the inner side of the workbench, one side of the pigment box is fixedly connected to a sliding block, the inner side of the workbench is provided with a lead screw, two ends of the lead screw are both connected to the two side walls of the workbench by means of second bearings, the lead screw penetrates the sliding block and is in threaded connection to the sliding block, one side of the workbench is fixedly connected to a second electric motor, an output end of the second electric motor is fixedly connected to the lead screw, an interior of a first side wall of the pigment box is connected to a fixing shaft by means of a third bearing, the fixing shaft penetrates a second side wall of the pigment box and is connected to the second side wall of the pigment box by means of a fourth bearing, a gear is fixedly arranged outside the fixing shaft in the sleeving manner, two marking wheels are fixedly arranged outside the fixing shaft in the sleeving manner, a bottom plate is fixedly embedded inside the pigment box, a sponge is arranged at a top of the bottom plate, a plurality of adsorption rods are fixedly embedded at a bottom of the bottom plate, the plurality of adsorption rods penetrate the bottom plate and are in contact with the sponge, and tops of the two marking wheels are in contact with a bottom of the MEA.

6. The on-line detection system according to claim 5, wherein a toothed plate is fixedly arranged inside the workbench, and the toothed plate is meshed with the gear.

7. The on-line detection system according to claim 5, wherein a slide rod is fixedly connected inside the workbench, and the slide rod penetrates the sliding block and is in sliding connection to the sliding block.

8. The on-line detection system according to claim 5, wherein the two marking wheels are arranged inside the pigment box.

9. The on-line detection system according to claim 1, wherein an arc-shaped baffle is fixedly arranged inside the workbench, and a bottom of the arc-shaped baffle is in contact with a top of the MEA.

10. The on-line detection system according to claim 1, wherein four corners of a bottom of the workbench are fixedly connected to supporting legs.

* * * * *